May 29, 1928.  1,671,592
A. J. KERCHER ET AL
ELECTRICAL WATER HEATER
Filed Dec. 17, 1925  2 Sheets-Sheet 2
FIG_4_
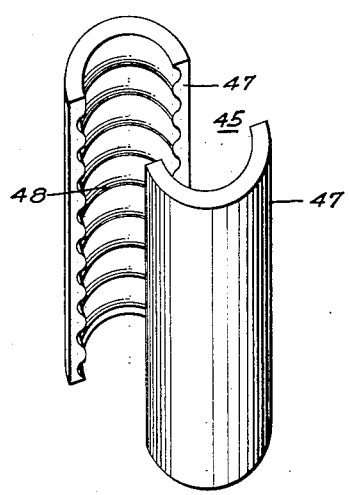
FIG_5_
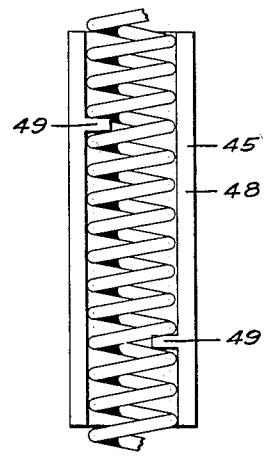
FIG_6_
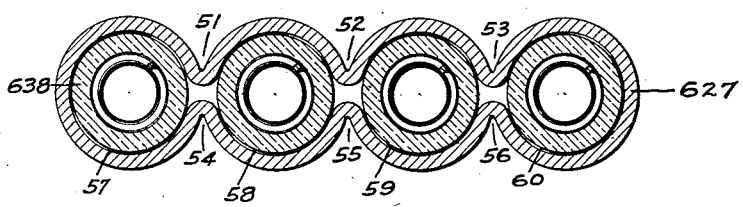
FIG_7_
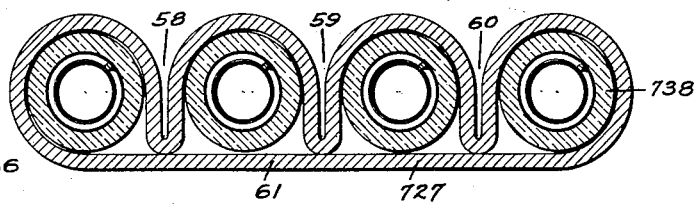
FIG_8_
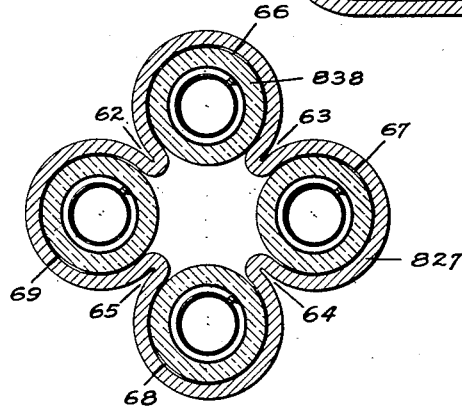
INVENTORS
ARTHUR J. KERCHER
WILLIAM WESLEY HICKS
BY
White Prost
ATTORNEYS Patented May 29, 1928.

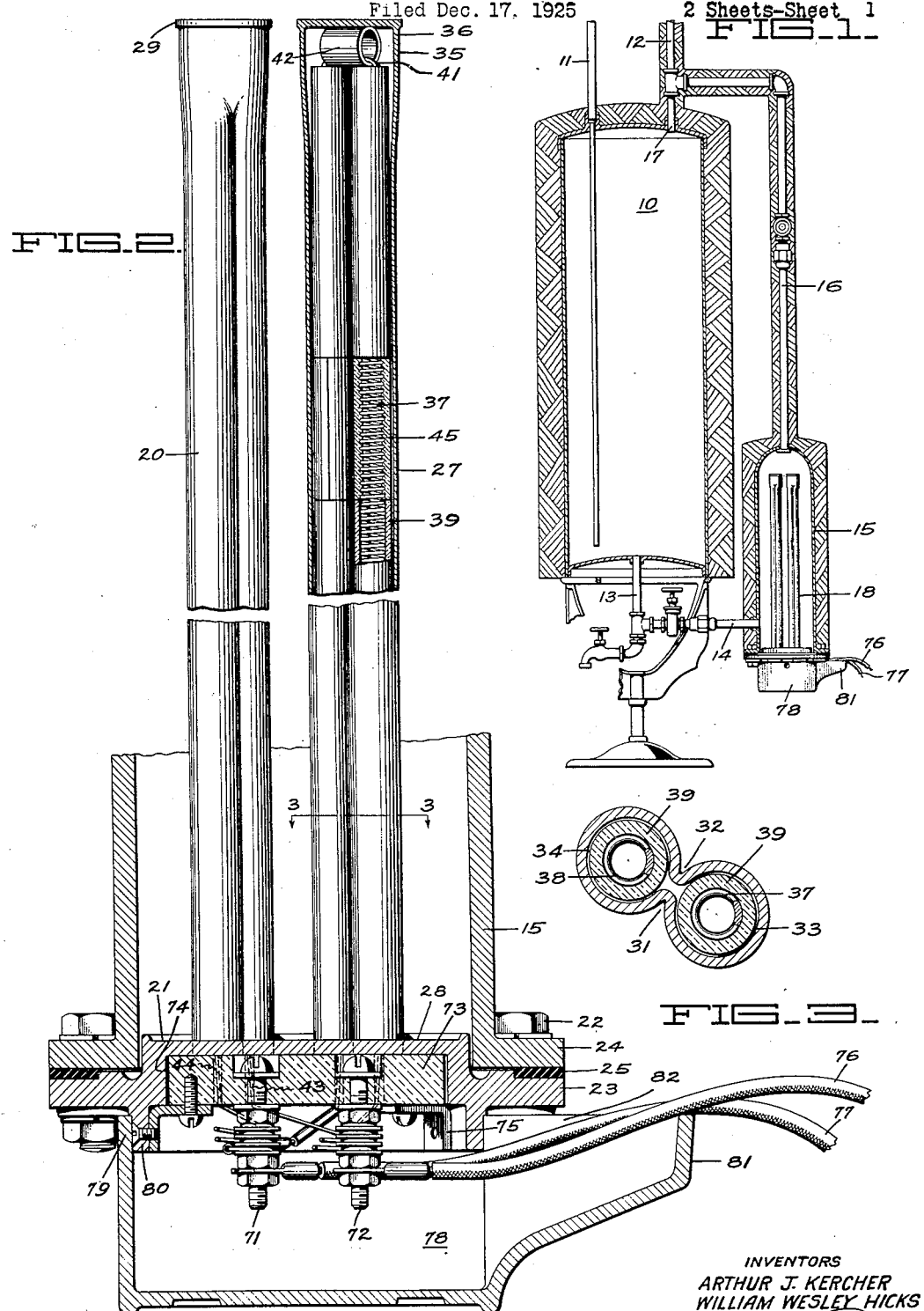

1,671,592

UNITED STATES PATENT OFFICE.

ARTHUR J. KERCHER, OF BERKELEY, AND WILLIAM WESLEY HICKS, OF SAN FRANCISCO, CALIFORNIA.

ELECTRICAL WATER HEATER.

Application filed December 17, 1925. Serial No. 75,988.

This invention relates generally to an electrical heating device for heating fluids and particularly to a heating device to be applied to a hot water tank. It is an object of this invention to devise a heater of this kind which will be inexpensive to manufacture, will have high electrical efficiency and will give long service.

It is a further object of this invention to devise an electrical fluid heater which will have substantially no thermal storage and a very small heat lag, that is, a heater in which the fluid will be heated within a short time after the circuit is closed to energize the resistance conductors.

It is a further object of this invention to construct an electrical fluid heater in which all of the heating elements are mounted upon a single header so that it may readily be applied to a shell through which the fluid to be heated is adapted to circulate and which will occupy a minimum of space.

It is a further object of this invention to devise a fluid heater in which the several heating elements are in the form of an elongated casing which is so shaped as to provide a plurality of longitudinal passageways connected by a lateral passageway at at least one end thereof, and to arrange an insulated resistance conductor within the passageways. It is proposed to shape the casing by creasing the same longitudinally and to terminate the crease short of one or both ends of the casing to provide the lateral passageway.

It is a further object of this invention to devise a fluid heater in which the separate heating elements are in the form of an elongated casing having a plurality of longitudinal passageways and an interconnecting lateral passageway, and to provide a resistance conductor within the passageways which is insulated from the casing by refractory insulators threaded over the conductor.

It is a further object of this invention to provide a heating unit in which means is provided intermediate the ends of the inclosing casing for engaging the resistance conductor so that sagging of the conductor will be prevented when the casing is arranged in an upright position.

Further objects of the invention will appear from the following description in which the preferred embodiments of the invention have been set forth.

Referring to the drawings:

Figure 1 is a transverse sectional view showing an electrical water heater embodying the electrical heating device of this invention.

Fig. 2 is an enlarged section in detail of the invention.

Fig. 3 is a transverse sectional view taken along line 3—3 of Fig. 2.

Fig. 4 is a detail of one form of insulating member for engaging the resistance conductor to prevent sagging of the same.

Fig. 5 is a detail view of another form of insulating member for engaging a resistance conductor.

Fig. 6 is a transverse sectional view showing a modified form of the inclosing casing.

Fig. 7 is a transverse sectional view showing another modification of the inclosing casing.

Fig. 8 is a transverse sectional view showing a third modification of the inclosing casing.

While the heating device of this invention may be employed to heat fluids of any kind, either gases or liquids, it is especially adapted for use as a hot water heater as shown in Fig. 1. Such water heaters usually comprise a water tank 10 having connected thereto a cold water supply pipe 11 which discharges adjacent the lower portion of the tank 10. The output pipe 12 through which the hot water is withdrawn communicates with the tank adjacent its upper end. An external thermal circulating system is provided for heating the water within the tank 10. Thus the water in the lower portion of the tank circulates through the pipes 13 and 14, through the shell 15 and through the pipes 16 and 17 to be returned again to the upper portion of the tank. Positioned within the shell 15 there is an electrical heating device designated generally as 18 for heating the water as it passes through this shell.

This heating device comprises generally a plurality of heating elements 20 which are secured to a header 21. It is preferable to secure the heating elements 20 to header 21 in such a manner that they are entirely supportd by the same so that the entire device may be removed as a unit from the heater. The header 21 is suitably secured to the lower end of the casing 15 as by means of screws or bolts 22 which clamp together the annular flanges 23 and 24 provided upon the header 21 and shell 15 respectively. A gasket 25 is inserted between the opposed faces of these flanges 23 and 24 to secure a water-tight fit.

The heating elements 20 are preferably constructed of a single elongated casing 27 suitably mounted at its one end in the upper plate 28 of the header 21 and closed at its upper end by means of a closure plate 29. The central portion 28 of the header is suitably apertured so as to allow the terminal conductors for the resistance elements to extend to the outer side of the header. It has been found preferable to secure the lower end of the casing 27 to the header by inserting the end of the casing in an aperture provided in the central portion 28 and then to weld, braze or solder the two portions together to form a fluid-tight connection. Similarly the closure member 29 is suitably secured to the upper end of the casing as by means of brazing, soldering or welding. Both the casing 27 and the closure member 29 are preferably constructed of some metal which has high heat conductivity, such as copper or brass.

In order to provide for the positioning of resistance elements within the casing the casing is preferably creased longitudinally to provide a plurality of longitudinal passageways. Thus, as shown in Fig. 3, the casing is provided with two opposed longitudinal creases or indentations 31 and 32 which provide a plurality of longitudinal passageways 33 and 34. In the particular form of casing shown in Fig. 3 the casing may be termed a duplex tube since two parallel tubular passageways are formed. It is of course obvious that the two opposed faces of the creased portions 31 and 32 may either be in contact to entirely separate the two passageways 33 or 34 or may be spaced from each other so that the two passageways are in communication. Instead of extending the creased portions 31 and 32 the entire length of the casing 21 they are preferably terminated short of the upper end so that the upper portion 35 of the casing is shaped to provide a lateral passageway 36, which interconnects the two longitudinal passageways 33 and 34. Thus, the contour of the upper portion 35 of the casing will be substantially an oval.

Positioned within the two longitudinal passageways 33 and 34 are the resistance conductors 37 and 38 which are preferably convoluted. In order to insulate the resistance conductors from the inner walls of the casing 27 they are provided with a series of contiguous refractory insulating tubes 39 which are threaded upon the conductors. These insulating tubes are constructed so as to have relatively thin walls and so as to be in intimate contact with both the inner walls of the passageways 33 and 34 and with the convoluted resistance conductors 37 and 38. In this way the heat lag, that is, the time which is takes for the heat to be conducted from the resistance conductors to the water in contact with the casing 27, will be reduced to a minimum.

The resistance conductors 37 and 38 are connected together at their upper ends by an interconnecting conductor 41 which is insulated by means of an apertured insulating member 42 which is arranged within the lateral passageway 36. The terminal wires 43 and 44 for the resistance conductors extend through the lower portion of the casing 27 and out through the outer side of the header 21. Since the heating elements 20 are normally operated in an upstanding or vertical position there will be a tendency for the convoluted resistance conductors 37 and 38 to sag intermediate their ends, thus making it possible for the adjacent convolutions to become short-circuited. To prevent this possibility means is provided for supporting the resistance conductors intermediate the ends of the casing. For this purpose certain of the insulating members 45 are provided with means for engaging the convoluted resistance conductors so as to prevent relative displacement longitudinally with respect to the casing 27. One form of engaging means is shown in Fig. 4, in which the intermediate insulating member 45 is split to provide two portions 46 and 47 having inner threads 48 adapted to engage the helical convolutions of the resistance conductor. This engagement will effectively prevent relative longitudinal displacement between the resistance conductor and the insulating member 45 and since the insulating members 39 are in contiguous relationship with each other and with the intermediate member 45 therefore this member will also be maintained stationary with respect to the casing 27. Another form of engaging means is shown in Fig. 5, in which one of the portions 48 of the split insulating member 45 is provided with inwardly extending projections 49, each of which engages between two adjacent convolutions of the resistance conductor.

Instead of creasing the casing 27 so as to form two longitudinal passageways it may be creased in such a manner as to form three or more such passageways. Thus, as shown in Fig. 6, the casing 627 is creased longitudinally at three points along one side thereof as at 51, 52 and 53 and is similarly creased at opposed points 54, 55 and 56 along its opposite side. This construction provides four longitudinal passageways 57, 58, 59 and 60 to provide means for positioning the resistance elements 638. Another form of casing is shown in Fig. 7, in which the casing is creased longitudinally only upon one side thereof as at the points 58, 59 and 60 while the side 61 is left plain. A further modification is shown in Fig. 8, in which the casing is creased longitudinally along four sides so as to provide four longitudinal passageways which are spaced equally about a common center. Thus, the casing 827 is creased as at spaced points 62, 63, 64 and 65 to provide four longitudinal passageways 66, 67, 68 and 69, spaced equally about a common center. Within the passageways are disposed the resistance elements 838.

Any suitable means may be provided for connecting together the terminals of the heating elements 20 on the outer side of the header 21. However, it is preferable to provide a plurality of terminal connectors 71 and 72 which are suitably mounted upon an insulating block 73. The insulating block 73 is suitably mounted on the outer side of the header 21 in a recess 74, as by means of a plurality of brackets 75. The terminal wires 43 and 44 of the heating elements 20 are brought out through the apertures in the insulating block 73 and connected to the terminal connectors 71 and 72 in any desired manner. A plurality of insulating conductors 76 and 77 serve to connect the terminal connectors 71 and 72 with a supply of current. In order to protect the outer side of the header 21 and to insure against accidental contact with the terminal connectors 71 and 72, the outer side of the header is entirely closed by means of a cup-shaped housing 78 having its upper rim 79 detachably secured to a depending flange 80 extending downwardly from the header 21. A lateral extension 81 is open at its upper side 82 and serves as a conduit for conveying the conductors 76 and 77 to the terminal connectors 71 and 72.

We claim:

1. A heating element comprising an elongated casing shaped to provide a plurality of longitudinal passageways and a transverse passageway at one end thereof, electrical resistance means disposed within said passageways, a plurality of refractory insulators strung upon said means to insulate the same from the inner walls of the casing, and electrical terminal wires for said resistance means extending from one end of said casing.

2. A heating element comprising an elongated casing having a longitudinally extending indentation in at least one side wall thereof to provide a plurality of passages, said indentation terminating short of one end of the casing to provide a lateral passageway, electrical resistance means disposed in said passageways and a plurality of refractory insulators threaded upon said resistance means to insulate the same from the inner walls of the casing.

3. In a device of the class described, an elongated heat transmitting casing arranged to extend upwardly, a convoluted resistance conductor disposed within said casing, a plurality of refractory insulators threaded upon said conductor to insulate the same from the inner walls of the casing, and means engaging the conductor intermediate the ends of the casing to prevent sagging of the same in a direction longitudinal of the casing.

4. In a device of the class described, a casing, a resistance conductor disposed within the casing, a split refractory insulator through which said conductor is adapted to extend, and means on the insulator engaging the conductor to prevent relative movement between the insulator and conductor.

5. In a device of the class described, an elongated casing for transmitting heat, a resistance conductor disposed within the casing, a plurality of contiguous refractory insulators through which said conductor is adapted to extend, and means on at least one of said insulators for engaging the conductor to prevent displacement of the same relative to said insulators.

6. In a device of the class described, an elongated casing for transmitting heat, a convoluted resistance conductor disposed within the casing, a plurality of refractory insulators through which said conductor is adapted to extend, and means on at least one of said insulators for engaging the convolutions of the conductor to prevent sagging of the conductor in a direction longitudinal of the casing.

7. An electrical heating element comprising a tube like sheet metal sheath indented longitudinally along one side thereof to define a plurality of inner longitudinal passageways, said sheath having an unindented integral end portion defining a lateral passageway connecting the longitudinal passageways, and an insulated resistance conductor disposed within said longitudinal passageways and interconnected thru said lateral passageway.

8. In an electrical heating device, an elongated heat transmitting casing, a resistance conductor arranged within said casing, a plurality of refractory insulators threaded upon said conductor to insulate the same from the walls of the casing, said insulators serving to transmit heat to the casing, and means engaging the conductor intermediate the ends of said casing for preventing sagging of the same in a direction longitudinal of the conductor.

In testimony whereof, we have hereunto set our hands.

ARTHUR J. KERCHER.
WILLIAM WESLEY HICKS.